United States Patent
Tian et al.

(10) Patent No.: US 8,811,011 B2
(45) Date of Patent: Aug. 19, 2014

(54) NOTEBOOK COMPUTER HAVING FOLDABLE DEVICE

(75) Inventors: Bo Tian, Shenzhen (CN); Kang Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 402 days.

(21) Appl. No.: 13/217,264

(22) Filed: Aug. 25, 2011

(65) Prior Publication Data

US 2012/0320516 A1 Dec. 20, 2012

(30) Foreign Application Priority Data

Jun. 20, 2011 (CN) .......................... 2011 1 0165658

(51) Int. Cl.
*H04M 1/00* (2006.01)
*H05K 5/00* (2006.01)
*H05K 7/00* (2006.01)

(52) U.S. Cl.
USPC ............ 361/679.55; 361/679.06; 361/679.15; 361/679.16; 361/679.28; 361/679.29; 455/575.3

(58) Field of Classification Search
USPC ................... 361/681, 683, 679.01, 801, 804, 361/679.29, 679.55, 679.15–679.3; 248/459–465, 472–474, 136, 150, 166, 248/434, 188.6–188.8, 259.11, 308; 369/282, 291, 253, 44.16, 367, 406, 369/381, 491
See application file for complete search history.

(56) References Cited

U.S. PATENT DOCUMENTS

| | | | | |
|---|---|---|---|---|
| 4,108,411 A | * | 8/1978 | Spratt et al. | 248/165 |
| 8,534,634 B2 | * | 9/2013 | Hu et al. | 248/371 |
| 2008/0094792 A1 | * | 4/2008 | Chen et al. | 361/681 |

FOREIGN PATENT DOCUMENTS

| | | |
|---|---|---|
| CN | 2752837 Y | 1/2006 |
| CN | 2754141 Y | 1/2006 |
| CN | 201111943 Y | 9/2008 |

* cited by examiner

*Primary Examiner* — Jenny L Wagner
*Assistant Examiner* — Jerry Wu
(74) *Attorney, Agent, or Firm* — Novak Druce Connolly Bove + Quigg LLP

(57) ABSTRACT

A notebook computer includes a display device, a main body, a pivoting component, and a foldable device. The display device includes a connection end. The pivoting component is pivoted to the connection end. The foldable device includes two arm components, each arm component includes a first supporting pole and a second supporting pole. Each first supporting is rotatably connected to the main body. Each second supporting pole is rotatably connected between the pivoting component and the first supporting pole.

10 Claims, 3 Drawing Sheets

NOTEBOOK COMPUTER HAVING FOLDABLE DEVICE

BACKGROUND

1. Technical Field

The present disclosure relates to notebook computers and, particularly, to a notebook computer having a foldable device.

2. Description of Related Art

A notebook computer includes a display device and a main body, which is equipped with a keyboard. The display device is pivoted to the main body by hinges. However, the height of the display device with respect to the main body typically cannot be adjusted as they are connected by the hinges. This is inconvenient for a user who wants to adjust the height of the display device when the notebook computer is in use.

What is needed is a disclosure, which can overcome the above shortcomings.

BRIEF DESCRIPTION OF THE DRAWINGS

Many aspects of the notebook computer can be better understood with reference to the following drawings. The components in the drawings are not necessarily drawn to scale, the emphasis instead being placed upon clearly illustrating the principles of the present notebook computer. Moreover, in the drawings, like reference numerals designate corresponding parts throughout the several views.

DETAILED DESCRIPTION

Embodiments of the present notebook computer will now be described in detail below and with reference to the drawings.

Figure 1:
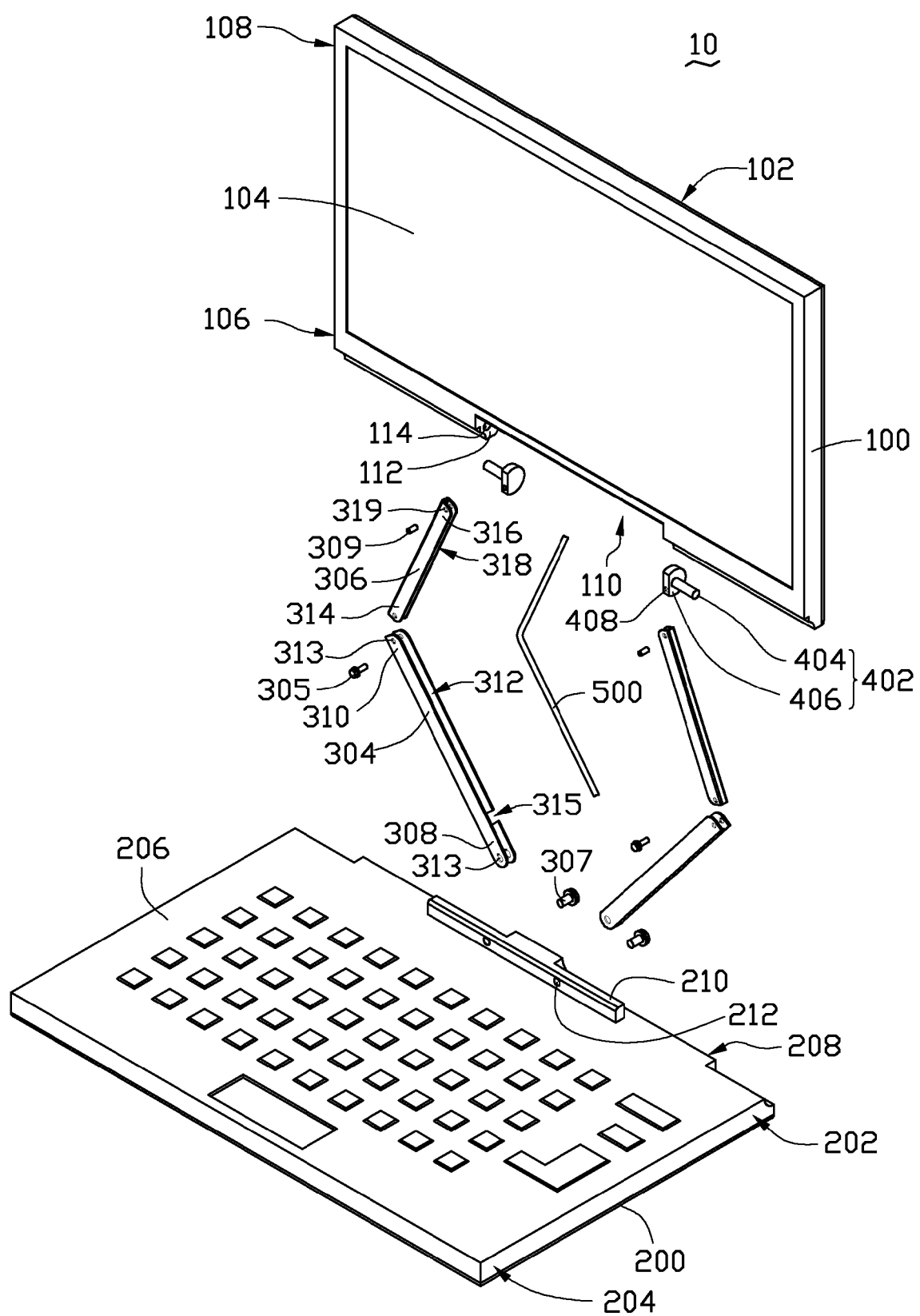
FIG. 1 is an isometric, exploded view of a notebook computer having a foldable device, according to an exemplary embodiment.
Figure 2:
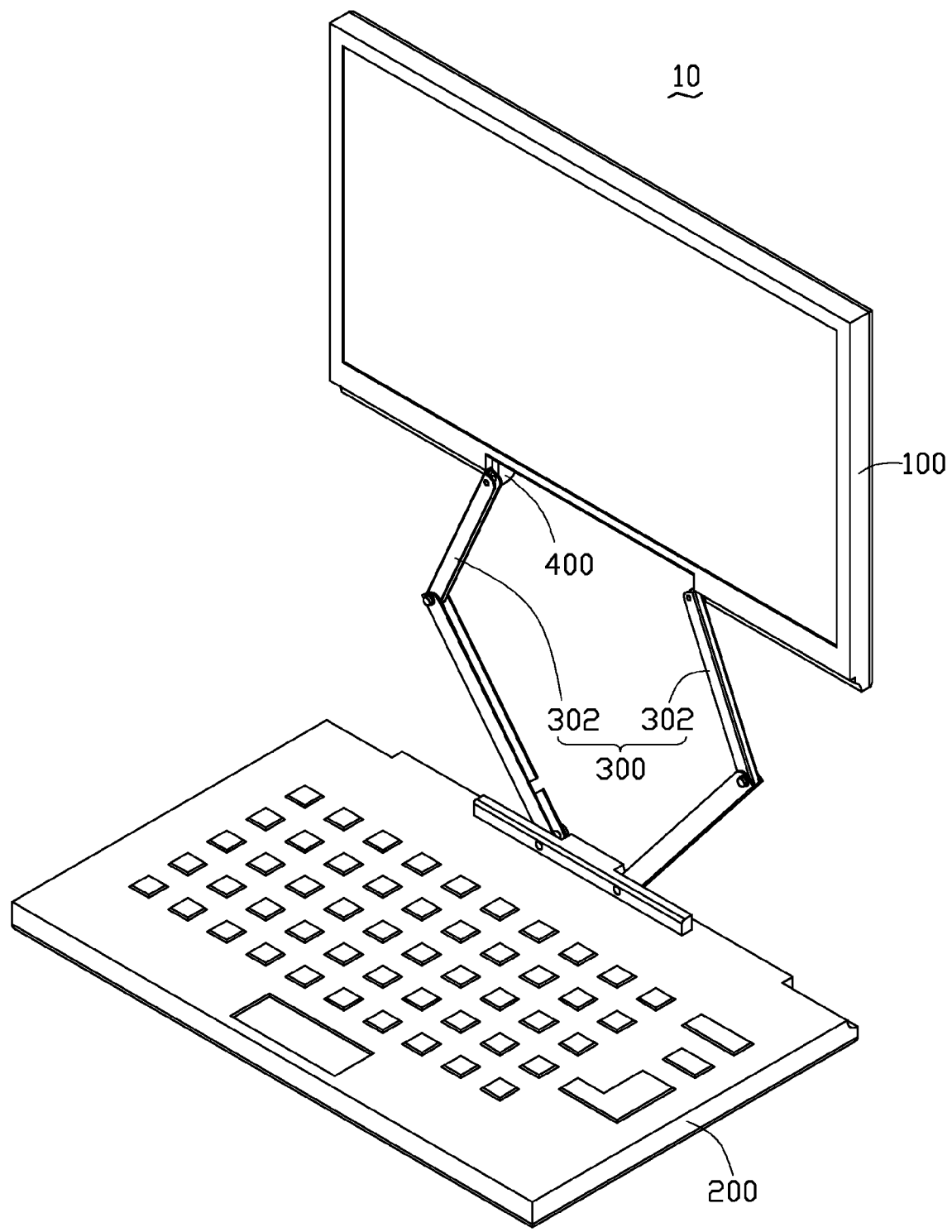
FIG. 2 is an isometric, assembled view of the notebook computer of FIG. 1, the foldable device being in an unfolded state.

Referring to FIGS. 1 and 2, a notebook computer 10 in accordance with an exemplary embodiment, includes a display device 100, a main body 200, a foldable device 300, a pivoting component 400, and a cable 500.

The display device 100 is generally cuboid and includes a first surface 102, a second surface 104 opposite to the first surface 102, a first connection end 106, and a top end 108 opposite to the first connection end 106. A screen (not labeled) is mounted on the second surface 104. The display device 100 defines a generally rectangular mounting indentation 110 in the middle of the first connection end 106. The mounting indentation 110 includes a pair of side surfaces 112 opposite to each other and perpendicular to the second surface 104. Each side surface 112 defines a first pivoting hole 114.

The main body 200 is generally cuboid and includes a second connection end 202, a front end 204 opposite to the connection end 202, a mounting surface 206, a rear surface 208 perpendicular to and connected to the mounting surface 206, and a mounting portion 210. The mounting surface 206 is substantially rectangular and includes a pair of long sides and a pair of wide sides. The mounting surface 206 is equipped with a keyboard. The mounting portion 210 is generally cuboid and perpendicularly protrudes from the mounting surface 206 adjacent to the second connection end 202. The mounting portion 210 corresponds to the mounting indentation 110. The mounting portion 210 defines two second pivoting holes 212. The second pivoting holes 212 extend along a direction perpendicular to the rear surface 208.

The foldable device 300 includes two arm components 302. Each arm component 302 includes a first supporting pole 304, a first latch 305, a second supporting pole 306, a second latch 307, and a third latch 309. Each first supporting pole 304 includes a first end 308 and a second end 310 distant from the first end 308. Each first supporting pole 304 defines a first receiving groove 312, two first through holes 313, and an opening 315. The first receiving groove 312 extends from the first end 308 toward the second end 310. The two first through holes 313 both communicate with the first receiving groove 312. The two first through holes 313 are respectively defined adjacent to the first end 308 and the second end 310. The opening 315 is defined between the two first through holes 313 and adjacent to the first end 308. A distance from the opening 315 to the second end 310 is substantially equal to the length of the second supporting pole 306.

Each second supporting pole 306 has a length shorter than that of the first supporting pole 304 and includes a third end 314 and a fourth end 316 distant from the third end 316. Each second supporting pole 306 defines a second receiving groove 318 and two second through holes 319. The second receiving groove 318 extends from the third end 314 toward the fourth end 316. The two second through holes 319 are respectively defined adjacent to the third end 314 and the fourth end 316. Both the two second through holes 319 communicate with the second receiving groove 318.

The pivoting component 400 includes two rotation shafts 402. Each rotation shaft 402 includes a shaft portion 404 and a head portion 406. Each shaft portion 404 is cylindrical and corresponds to a first pivoting hole 114. Each head portion 406 is generally cylindrical and connected to the shaft portion 404. Each head portion 406 defines a blind hole 408 extending along an radical direction of the shaft portion 404.

The cable 500 is connected between the display device 100 and the main body 200 for transmitting signals therebetween. A length of the cable 500 is substantially equal to sum of the length of the first supporting pole 304 and the second supporting pole 306.

When assembling, each second pivoting hole 212 is aligned with a first through hole 313 adjacent to the first end 308, each second latch 307 is interferentially fitted into each second pivoting hole 212 and passes through the corresponding first through hole 313, such each first supporting pole 304 is rotatably connected to the mounting portion 210. Each third end 314 is received in the first receiving groove 312 with each first through hole 313 adjacent to the second end 310 aligning to a second through hole 319 adjacent to the third end 314. Each first latch 305 is interferentially fitted into the each first through hole 313 adjacent to the second end 310 and a second through hole 319 adjacent to the third end 314, such that each second supporting pole 306 is rotatably connected to each first supporting pole 304. The two first receiving grooves 312 of the two first supporting poles 304 face each other. The two second receiving grooves 318 of the two second supporting poles 306 face each other. The first receiving groove 312 and the second receiving groove 318 of one arm component 302 cooperatively receive the cable 500. Each second through hole 319 adjacent to each fourth end 316 is aligned with each blind hole 408, each third latch 309 is interferentially fitted into the each blind hole 408, such that each second pole 306 is rotatably connected to each rotation shaft 402. Each shaft portion 404 is interferentially fitted into a first pivoting pole 114, such that the display device 100 can be rotated about the rotation shafts 402.

After assembling, each first latch 305, each second latch 307, and each third latch 309 is perpendicular to the rear surface 208. The two arm components 302 are symmetrical about a mid-perpendicular plane of the mounting surface 206 and arranged along a direction parallel to the long sides of the mounting surface 206.

Figure 3:
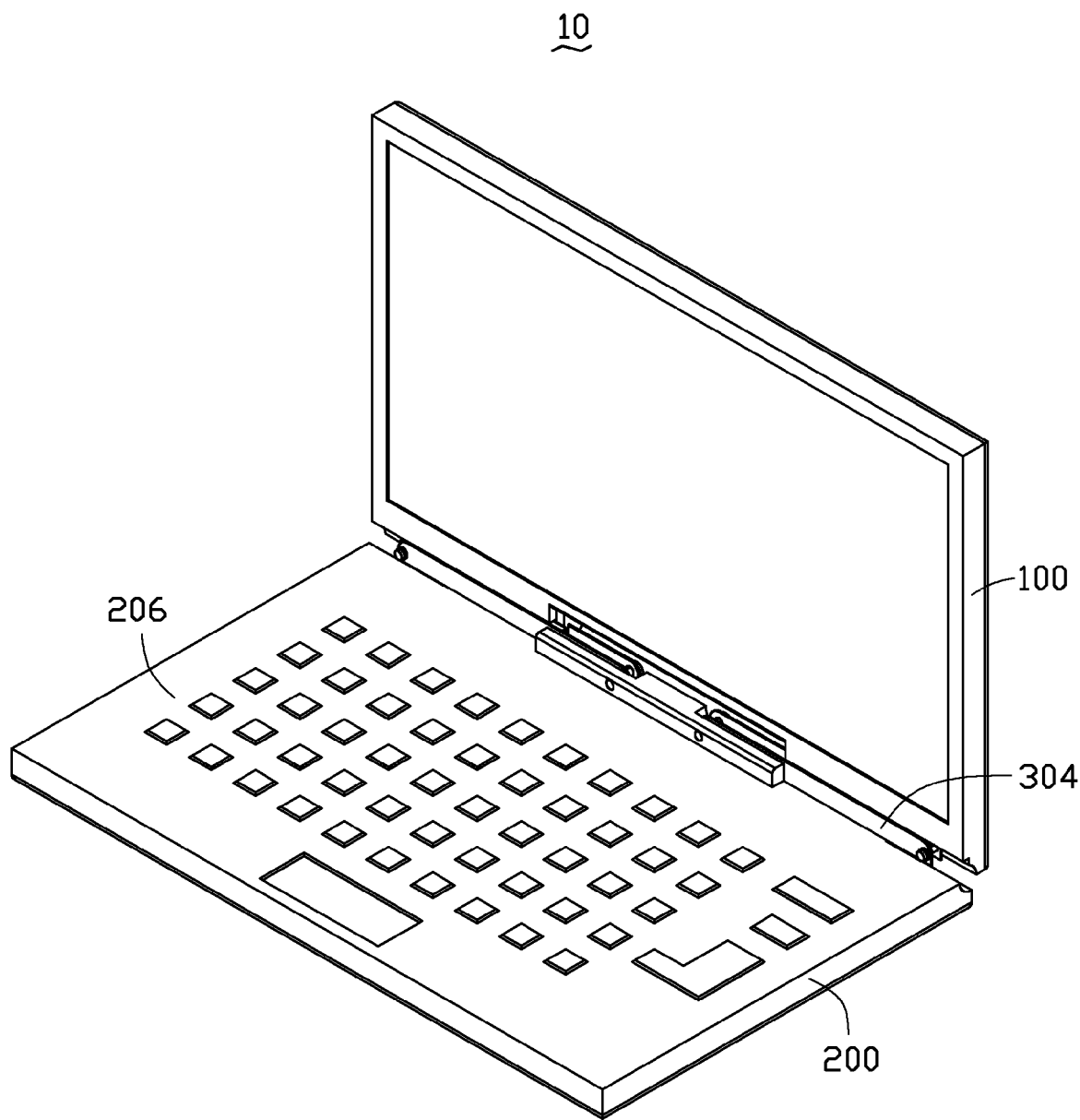
FIG. 3 is similar to FIG. 2 but showing the foldable device in a folded state.

Referring to FIGS. 2 and 3, in use, first the foldable device 300 is in a folded state, each second supporting pole 306 is received in a first receiving groove 312 of a first supporting pole 304. Each head portion 406 is received in an opening 315. Each first supporting pole 304 attaches on the mounting surface 206. The mounting portion 210 is receiving in mounting indentation 110 (as shown in FIG. 3). The display device 100 can be rotated about the rotation shafts 402 such that the display device 100 can be adjusted to a suitable viewing angle for a user. When the display device 100 is rotated to the position in which the second surface 104 is substantially perpendicular to the mounting surface 206. The user can pull the display device 100 and make the display device 100 move away the main body 200 along the direction substantially perpendicular to the mounting surface 206. The first supporting poles 304 are rotated about the respective mounting portions 210 such that the second ends 310 of the first supporting poles 304 are moved towards each other. Each second supporting pole 306 is rotated about a corresponding first latch 305 and is moved out of the corresponding first receiving hole 312 (as shown in FIG. 2). The height between the display device 100 and the main body 200 along the direction substantially perpendicular to the mounting surface 206 can be conveniently adjusted.

Because each first latch 305, each second latch 307, and each third latch 309 is perpendicular to the rear surface 208. The display device 100 can avoid being freely moved along radical directions of the rotation shaft 402 when the second surface 104 is not substantially perpendicular to the main body 200.

The above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A notebook computer, comprising:
a display device comprising a first connection end;
a main body;
a cable electrically connecting the display device with the main body;
a pivoting component pivoted to the first connection end; and
a foldable device comprising two arm components, each arm component comprising a first supporting pole and a second supporting pole, each first supporting pole being rotatably connected to the main body, each second supporting pole being rotatably connected between the pivoting component and the corresponding first supporting pole;
wherein each first supporting pole defines a first receiving groove, and each second supporting pole defines a second receiving groove, and each second supporting pole is received within the corresponding first receiving groove and the cable is received between the first receiving groove and the second receiving groove when the foldable device is in a folded state.

2. The notebook computer of claim 1, wherein each first supporting pole comprises a first end and a second end, the first receiving groove extends from the first end toward the second end, the two first receiving grooves of the two first supporting poles face each other; a length of each second supporting pole is shorter than that of each first supporting pole, each second supporting pole comprises a third end and a fourth end, the second receiving groove extends from the third end to the fourth end, the two second receiving grooves of the two second supporting poles face each other; the first end of each first supporting pole is rotatably connected to the main body, the second end of each first supporting pole is rotatably connected to the third end of the respective second supporting pole, the fourth end of each second supporting pole is rotatably connected to the pivoting component; the first receiving groove of each first supporting pole is configured to received the respective second supporting pole.

3. The notebook computer of claim 2, wherein each first supporting pole defines a first through hole adjacent to the second end, the first through hole communicates with the first receiving groove; each second supporting pole defines a second through hole adjacent to the third end, the second through hole communicates with the second receiving groove; each arm component comprises a first latch, the first latch is interferentially fitted into the first and second through holes of each arm component to connect the first and second supporting poles together.

4. The notebook computer of claim 2, wherein the main body comprises a second connection end, a mounting surface equipped with a keyboard, and a mounting portion substantially protruding from the mounting surface adjacent to the second connection end, each first supporting pole is rotatably connected to the mounting portion, the display device comprises a mounting indentation defined in the middle of the first connection end, the mounting indentation receives the mounting portion when each first receiving groove receives the respective second supporting pole.

5. The notebook computer of claim 4, wherein the mounting indentation comprises a pair side surfaces facing each other and perpendicular to the mounting surface, each side surface defines a first pivoting hole; the pivoting component comprises two rotation shafts, each rotation shaft comprises a shaft portion and a head portion connected to the shaft portion, each shaft portion is interferentially fitted into the respective first pivoting hole, the head portion is rotatably connected to the fourth end of the respective second supporting pole.

6. The notebook computer of claim 5, wherein each second supporting pole defines another second through hole adjacent to the fourth end and communicating with the second receiving groove; each head portion defines a blind hole; each arm component comprises a third latch; each third latch is interferntially fitted into the another second through hole of the respective second supporting pole and the blind hole of the respective head portion.

7. The notebook computer of claim 5, wherein each first supporting pole defines an opening, each head portion is received in the respective opening when each first receiving groove receives the respective second supporting pole.

8. The notebook computer of claim 4, wherein the mounting surface is substantially rectangular, the two arm components are symmetrical about a mid-perpendicular plane of the mounting surface and arranged along a direction parallel to a lengthwise direction of the mounting surface.

9. The notebook computer of claim 4, wherein each first supporting pole defines another first through hole adjacent to the first end and communicating with the first receiving groove; the mounting portion defines two second pivoting holes, each second pivoting hole is aligned with the another first through hole of the respective first supporting pole; each arm component comprises a second latch, each second latch is interferentially fitted into the another first through hole of the respective first supporting pole and the respective second pivoting hole to connect the respective first supporting pole to the mounting portion.

10. The notebook computer of claim 9, wherein the main body is generally cuboid and comprises a rear surface perpendicular to and connected to the mounting surface, the second pivoting holes extend along a direction perpendicular to the rear surface.

* * * * *